United States Patent [19]

Hogg

[11] 4,329,749
[45] May 18, 1982

[54] FRAME FOR COMB HONEY

[76] Inventor: John A. Hogg, 2225 S. 36th St., Galesburg, Mich. 49053

[21] Appl. No.: 120,951

[22] Filed: Feb. 13, 1980

[51] Int. Cl.³ .................... A01K 47/02; A01K 47/04
[52] U.S. Cl. ............................................ 6/2 R; 6/11; 6/10
[58] Field of Search .................. 6/2 R, 2 A, 10, 11

[56] References Cited

U.S. PATENT DOCUMENTS

| 31,658 | 3/1861 | Daniels et al. | 6/2 R |
|---|---|---|---|
| 452,366 | 5/1891 | Ferguson | 6/2 R |
| 529,116 | 11/1894 | Ferguson | 6/2 R |
| 2,023,959 | 12/1935 | Knox | 6/10 |
| 4,195,379 | 4/1980 | Krasnik | 6/11 |

FOREIGN PATENT DOCUMENTS

| 958111 | 3/1950 | France | 6/11 |
| 2023395 | 1/1980 | United Kingdom | 6/2 R |

Primary Examiner—G. E. McNeill
Assistant Examiner—Robert P. Swiatek
Attorney, Agent, or Firm—Blanchard, Flynn, Thiel, Boutell & Tanis

[57] ABSTRACT

Device for making comb honey. A novel section is provided for the making of comb honey together with a novel arrangement thereof in a super whereby the sections combine into a single unit a number of presently used separate components, namely the section perimeter, the foundation, spacers, the separator, the package, and a serving platter. Specifically, a comb forming section is provided with the foundation at the bottom thereof which foundation is backed by suitably sloped spacing portion for cooperation with an adjacently positioned section and legs also cooperating with an adjacently positioned section to effect appropriate spacing of same. The section with its foundation at the bottom of the section perimeter and legs fixed adjacent thereto may, after filling of same by the bees, then further function as a serving dish.

11 Claims, 10 Drawing Figures

FRAME FOR COMB HONEY

FIELD OF THE INVENTION

The invention relates to means for the production of comb honey and specifically to a comb section for filling by the bees together with means for positioning same in a proper manner within a super.

BACKGROUND OF THE INVENTION

Although beekeeping, and the obtaining of honey as a product thereof, has been intensively practiced for several hundred years, there has been relatively little change in the means by which same has been practiced since the invention of wax foundation by Johannes Mehring in 1857 and since the basic invention by Langstroth in 1853 of the hive in essentially the form still being used.

While the majority of honey is separated from the comb in which it is formed, there are large numbers of people who regard comb honey as a delicacy. Prior practice, however, in the making of comb honey has required considerable care, attention and inconvenience in the provision and manipulation of the sections in which the comb is to be formed and has further involved at best an inconvenient and messy situation in the serving of such honey at the table.

Particularly in the prior practice, it has been assumed that it is necessary to provide the foundation in the middle of a section whereby the bees will build comb for only approximately ¾ inch on either side thereof. The basis of the present invention is the discovery that the bees will actually build comb consistently without the appearance of burr comb for a distance of at least 1¼ inch from the foundation in one direction only under the conditions set up by the present invention. From this discovery, it follows that the foundation may be placed at the bottom of the section which in turn provides advantages in both the arrangement of the sections within the hive and in the serving to the table of a finished section of comb honey, all of which are set forth further hereinafter.

Accordingly, the objects of the invention include:

1. To provide a novel section for comb honey which will combine into a single unit a number of components which are separate in current practice whereby to make the arrangement within a hive of means for making comb honey more easy and convenient for the beekeeper.

2. To provide a novel section for the production of comb honey, as aforesaid, together with appropriate means for arranging same within a super.

3. To provide a novel comb section and means for arranging same within a super, as aforesaid, which will insure the building by the bees of full and satisfactory sections which will be attractive in appearance and thereby provide a marketable product.

4. To provide a section for the production of comb honey and means for mounting same within a super, as aforesaid, which will be removable after completion of the filling process in a simple and effective manner with a minimum of handling of components other than the sections themselves.

5. To provide sections for the production of comb honey, as aforesaid, which can be utilized directly if desired as the means for packaging, distribution and serving honey at the table.

6. To provide means, as aforesaid, for the production of comb honey with less labor and cost than by current methods and which can be utilized by methods sufficiently similar to presently practiced methods for the production of comb honey that same will be easily employed by a beekeeper familiar with current means and methods for the production of comb honey.

Other objects and purposes of the invention will be apparent to persons acquainted with equipment of this general type upon reading the following specification and inspection of the accompanying drawings.

DETAILED DESCRIPTION

Figure 1:
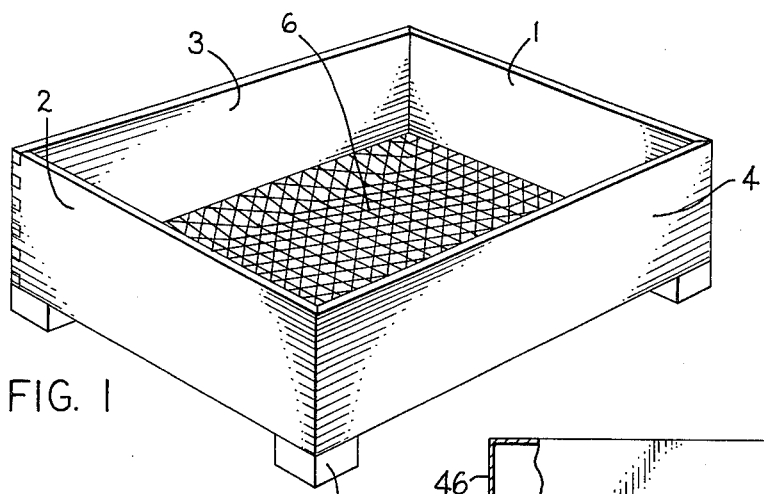
FIG. 1 is an oblique view of a section for comb honey embodying the present invention.

Referring first to the preferred comb honey section embodying the invention, attention is invited first to FIG. 1 wherein there is shown a comb honey section comprising ends 1 and 2, sides 3 and 4 and a bottom 6. Said sides may be, and normally are, made of wood as is presently conventional in the provision of comb honey but may, if preferred, be formed of any suitable plastics material acceptable for use with food, such as polyethylene, polypropylene or the like.

The bottom 6 (FIG. 4) comprises a structural portion 7 together with a wax foundation 8. Said structural portion 7 is fixed to the sides 1, 2, 3 and 4 in any convenient manner such as by an adhesive or by being made integral therewith if same is made of a plastics, or other castable or moldable material, and is provided with a sloped portion 9 around its entire perimeter. The exact thickness of said structural portion 7 and the angle of said slope are both important and will be dealt with in more detail hereinafter. The wax component 8 may be a sheet of ordinary foundation wax cut to fit the interior of said section or it may be wax suitably sprayed on a properly embossed surface 10 of the structural portion 7. In some instances it may be possible with a comb section of plastics material to omit the wax surface entirely and, with appropriate embossing of the upper surface of said bottom, permit the bees to build comb directly on the plastics bottom.

The distance from the exposed surface of the foundation 8 will be at least ¾ inch and will more often be as much as 1¼ inch. Legs 11 are also preferably provided for said sections which legs may be formed in any convenient manner, such as by comprising protrusions from the structural portion 7 or as extensions from the sides 1–4 as desired. In the illustrated embodiment, same are shown as being protrusions from the structural portion 7.

Figure 2:
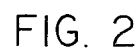
FIG. 2 is an end view of said section together with a cover for use in packaging the honey for marketing, both said section and said cover being shown in a partially sectional view.

There is also shown in FIG. 2 a cover 46 which can be used in the marketing of the honey if desired as further discussed hereinafter.

Figure 3:
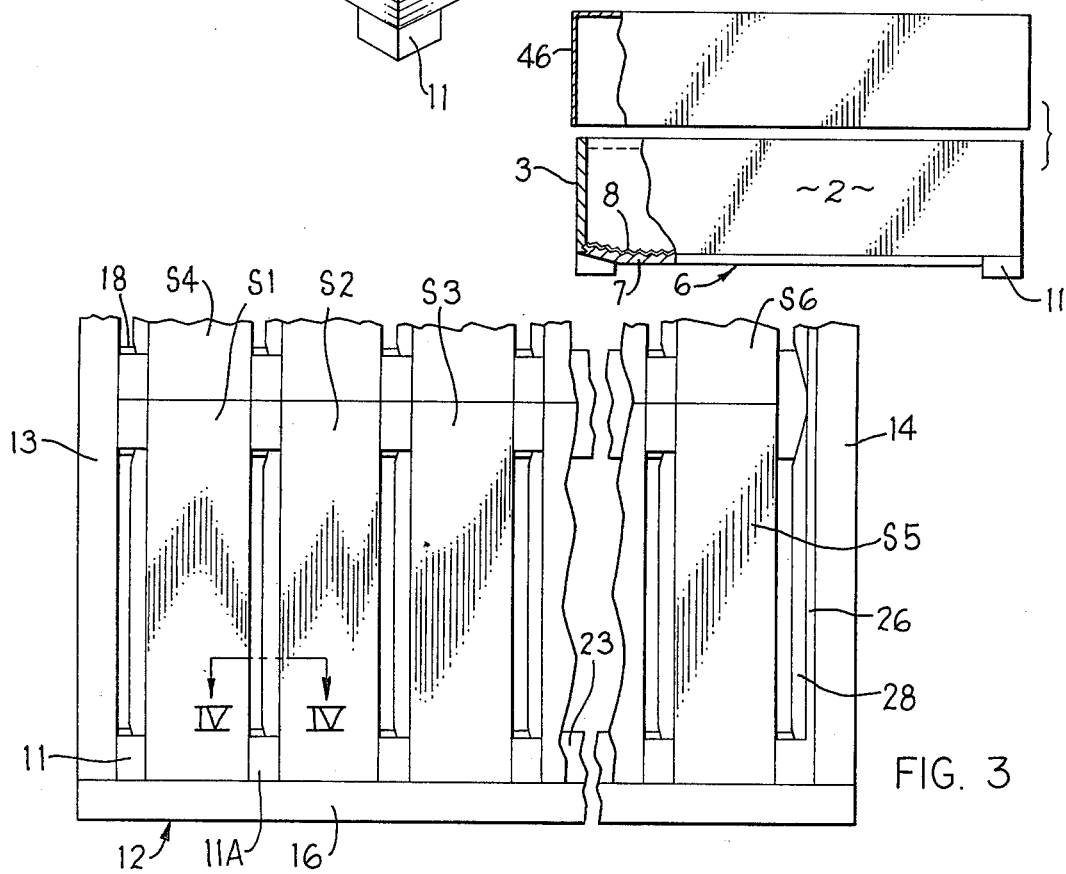
FIG. 3 is a partially broken top view of a series of sections embodying the invention arranged within a super for the production of comb honey.
Figure 5:
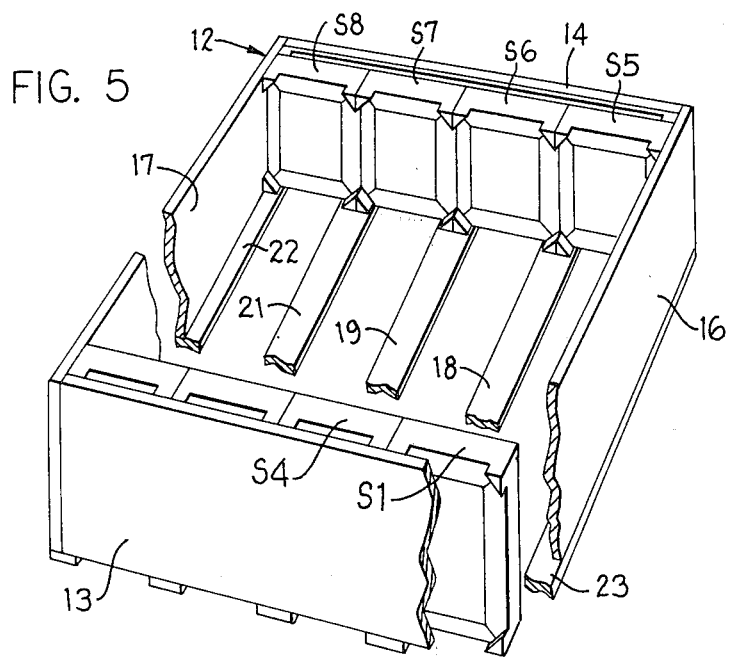
FIG. 5 is a partly broken, partly fragmentary, oblique view of a super with a few of the comb honey sections placed therein in the position for filling by the bees.
Figure 7:
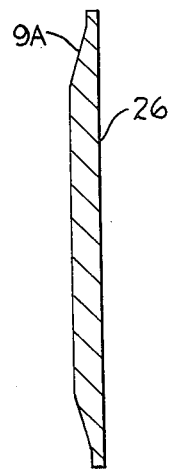
FIG. 7 is a section taken on the line VII—VII of FIG. 6.
Figure 6:
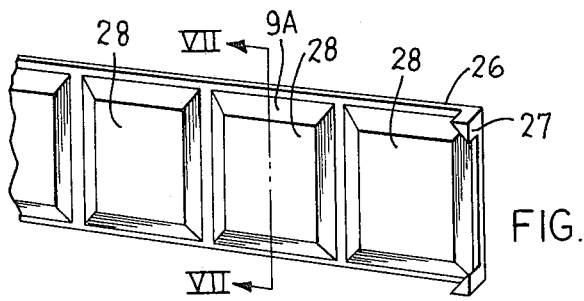
FIG. 6 is an oblique view of an end plate used with said sections.
Figure 8:
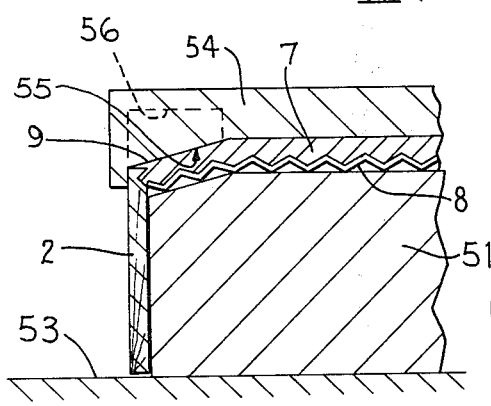
FIG. 8 is a fragmentary sectional view illustrating one means for making the comb honey sections.

Referring now to FIGS. 3 and 5, there is illustrated the manner by which the sections as described are arranged within a super for filling by the bees. The super 12 is itself of generally conventional construction, namely of any desired, normally standard, size with ends 13 and 14 and sides 16 and 17. To such super there is in the present invention added suitable support strips 18, 19 and 21 extending lengthwise across the bottom thereof for a purpose and in a spacing set forth further hereinafter.

The several sections are sized so that a suitable number, usually four, of them will fit snugly between the sides 16 and 17 of the super (FIG. 5). Side support strips 22 and 23 may if desired also be provided along the sides of the super for supporting the edges of the sections and said support strips 18, 19 and 21 are spaced to support adjacent ends of each of said sections as shown. The sections are placed within the super by being merely rested on the bottom supports, section S1 resting on the supports 18 and 23 and being urged against the end 13 and side 16. The legs 11 of section S1 bear against the end 13 to provide space therebetween for bees to travel upward through one super to reach another super superposed thereon. The next section S2 is likewise placed for support upon the strips 18 and 23 and its legs 11A bear against the facing edges of the ends and sides of the section S1 and thereby effect proper spacing of the section S2 from the section S1. Section S3 is arranged likewise on the supports 18 and 23 and bears against the side 16 and is spaced by its legs from the section S2 in the same manner as section S2 is spaced from section S1. A further section S4 is placed adjacent and contacting the section S1, is supported by bottom strips 18 and 19 and spaced by its legs from the end 13 of the super in the same manner as above described for the section S1. In this manner, the entire super is filled with comb honey sections with the last sections to be installed being sections S5, S6, S7 and S8. The sections are preferably so sized with respect to the interior dimensions of the super that when the last sections are in place and same are all urged (leftwardly as seen in FIG. 3) so that same are all bearing snugly against each other and against the end member 13, there remains a small space, as approximately ½ inch, between the row of sections comprising sections S5–S8 and the end member 14 of the super. This space is then filled by a filler plate 26 having legs 27 thereon corresponding to the legs 11 of the several sections and of such size as to bear snugly against the sections S5–S8 to hold all of said sections snugly within the super. On the filler plate 26, there are also provided raised zones 28 corresponding in size and shape with the structural portions 7 of the several sections.

Thus, said sections can all be placed within the super by merely dropping same into place and the use of the presently common section frame is eliminated.

Figure 9:
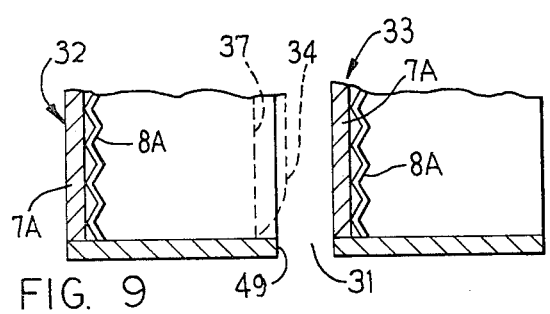
FIG. 9 is a sectional view similar to FIG. 4 and illustrating a modification.

Turning now to the shape and size of said structural component 7 of the bottom 6, same can be best understood by considering first the results obtained if the sloped shape of the bottom of structural member 7 is replaced by a flat bottom surface. For this purpose, attention is now invited to FIG. 9 wherein the bottom of the comb section is flat and wherein some but not all of the advantages of the invention may thus be obtained. FIG. 9 shows two sections 32 and 33 which are similar to sections S1 and S2, excepting for the shape of their respective bottom members, and have a flat bottom structural member 7A. Foundation 8A is similar to foundation 8 and the side and end members of sections 32 and 33 are identical with the corresponding parts of sections S1 and S2. Next, it should be noted that bees require a minimum of between 5/16 and ⅜ inch for carrying on two-way traffic between a pair of walls or through an opening and require a minimum of 3/16 inch for one-way traffic. This is derived from the fact that the minimum space required for occupancy by a bee ranges from about 5/32 to about 3/16 inch. Thus, if the bottom of a comb section were flat as illustrated in FIG. 9, it would be necessary to provide a minimum of 3/16 inch at the space 31 for entry of bees into the working zone between the two sections 32 and 33 and even that space would be so restrictive as to considerably slow the working of the bees. Thus, the space 31 would facilitate more rapid working by the bees if same were of 3/16 to ⅜ inch. However, if the space 31 is from 5/16 to ⅜ inch, there would be a tendency for the surface 34 of the comb in section 32 to approach within about the same distance of the bottom 7A of the section 33 and might in some instances approach even closer. This would make the section 32 somewhat less desirable in appearance and would also, if the surface 34 projects beyond the sides of the section 32, make it more difficult to stack. It is therefore desirable to keep the surface of the comb within section 32 at a level somewhat lower than that of the sides of said section, such as the level indicated by the line 37. This latter is what is accomplished by the structural portion 7 of the preferred form of comb section illustrated in FIGS. 1–8.

Figure 4:
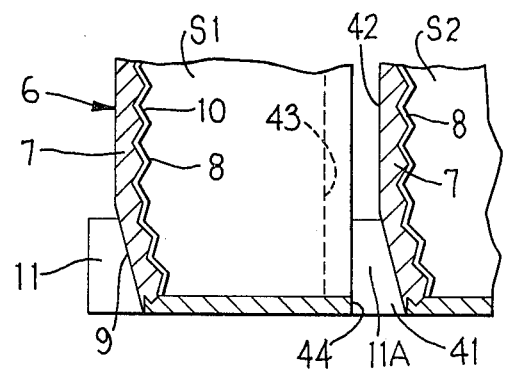
FIG. 4 is a fragmentary view of two of said sections taken on the line IV—IV of FIG. 3.

In this construction, the space 41 (FIG. 4) is determined by the length of the legs 11 of section S2 and will preferably be between 5/16 and ⅜ inch in extent. The surface 42, however, of said structural portion 7 does not project beyond the ends of said legs but it is positioned with respect to said legs 11A such that it moves the working space for the bees slightly to the left as seen in FIG. 4 and thereby holds the surface 43 of the comb in section S1 at a level below the top edge 44 of said section S1. Thus, the maximum needed working space may be provided for the bees, namely the 5/16–⅜ inch dimension, and yet there is no danger of the surface 43 of comb in section S1 projecting beyond the upper edges as the edge 44 of section S1. Specifically if, for example, the surface 42 is approximately 3/16 of an inch above (to the right in FIG. 4) the bottom surface (leftward in FIG. 4) of the leg 11A, and said leg 11A is ⅜ inch long, then the surface 43 of the comb in section S1 will remain at least ¼–⅜ inch to the left of said surface 42 and thus approximately 1/16–3/16 inch below (to the left in FIG. 4) the upper edges, as the edge 44, of said section S1. This provides maximum working space for the bees while still maintaining the surface in each comb section at a desirable contour and location.

The raised portions 28 of the strip 26 are shaped to function with respect to the comb sections S5–S8 in the same manner as above described for the structural portion 7 of section S2 with respect to the surface of the comb in section S1.

Figure 10:
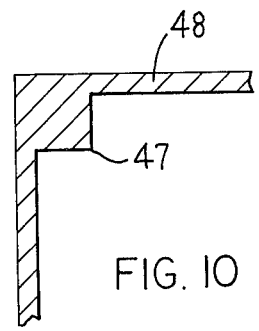
FIG. 10 is a sectional view of a cover appropriate for use with the modification of FIG. 9.

When the honey is removed from the super, each section is independent of every other section and may be marketed directly without further processing. A cover, as the cover 46, may be provided for fitting over the top of each of said sections and same may be printed and/or illustrated as desired. Said cover may be of paper, fiberboard, plastic or other material as convenient. If flat bottomed sections such as shown in FIG. 9 are used, it will then often be desirable to provide a small step in the cover, as at 47 in FIG. 10 in order to space the web 48 of this cover slightly above the top, as edge 49, of a section such as the section 32 whereby to enable said web 48 to clear any upwardly rising comb such as that illustrated by line 34 in FIG. 9.

The fabrication of the comb sections of the invention may as already indicated be of any convenient nature. In the illustrated embodiment, the side and end components 1-4 are made of wood and the structural portion 7 together with the legs 11 are made of plaster of paris. This is accomplished by first laying a piece of conventional wax foundation 8 cut to the appropriate size on top of a block 51 and then dropping the sides 1-4 of a section downwardly in a manner surrounding said block, the level of the limiting surface 53 (or the height of block 51) being desirably chosen to permit an inwardly notched portion of each side to extend above the wax foundation 8. The space then within said side and end walls 1-4 and above the comb foundation is filled with plaster of paris and a suitable die member 54 pressed downwardly thereon. Said die member has an appropriate slope 55 to provide the sloped surfaces 9 as above described and is further provided with suitable cavities, of which one is indicated at 56, for the formation of the legs 11. Upon hardening of the plaster of paris, the die member 54 is removed and the comb section is complete and ready for use.

If said comb section is made from a plastics material, then any conventional molding technique, normally injection molding, may be used and in such case the foundation wax 8, if used, will be applied in any convenient manner, such as by an appropriate piece being pushed into place or by the wax being sprayed upon a suitably embossed surface of the plastic bottom. However, any desired fabrication technique may be used as well as a wide range of materials as convenient as will be apparent to those skilled in the art.

It will be recognized that the comb sections may be made of any desired shape as selected for marketing purposes. While they are normally and conveniently of square or rectangular shape as shown, same may be of other shapes, such as triangular, hexagonal or circular provided, however, that if a shape is utilized which does not nest snugly within a super, then suitable plugs will need to be provided to fill the intervening spaces and prevent the bees from forming burr comb therein.

It will be seen that the comb sections of the invention are easily made, extremely easy to utilize and greatly facilitate the marketing of the finished product. They are highly versatile in available shapes and sizes but maintain maximum efficiency in their adaptability to the bees' habits and honey producing procedures.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for producing comb honey in a hive having a hive body, the combination comprising:
    a super for superposing on the hive body and having ends and sides;
    a plurality of separate comb sections positioned within said super, each of said sections having perimeter components with top and bottom edges;
    each of said sections further having a bottom fixedly connecting the bottom edges of said perimeter components of that section, said bottom having a foundation surface thereon within said section, said sections being arranged in a row in said super so the bottom on one section faces toward the top edges of the next section in said row, said bottom of said one section being spaced along at least a portion of its periphery from the opposed top edges of said next section by a bee entry of height sufficient for bees to pass between said one section bottom and next section top edges, the central portion of said one section bottom bounding the bee working zone in said next section and therewith limiting the building of comb in said next section at a height to prevent more than the desired filling of said next section;
    means projecting from each of said sections for effecting said spacing of said one section bottom portion from said next section top edges.

2. The device of claim 1 wherein said projecting means, in ones of said sections whose bottoms are adjacent one end wall of said super, comprise projections spacing said bottoms from said end wall.

3. In a device for producing comb honey in a hive having a hive body, the combination comprising:
    a super for superposing on the hive body and having ends and sides;
    a plurality of separate comb sections positioned within said super, each of said sections having perimeter components with top and bottom edges;
    each of said sections having a bottom connecting the bottom edges of said perimeter components and having a foundation surface thereon within said section and means projecting from each of said sections for effecting the appropriate spacing of said sections from each other, the bottom of each of said sections including an outer face which is beveled along at least a portion of its perimeter whereby to provide appropriate access for bees between a pair of sections into the space within one of said sections while simultaneously limiting the extent to which bees will build comb within said one section.

4. The device of claim 3 wherein said projecting means are legs and said legs of a given section project beyond the bottom face of said section.

5. An open top comb section cooperable with a similar next comb section to form a row for the production of comb honey in a hive, comprising:
    perimeter means defining the sides of said section and closure means along the bottom edge of said perimeter means defining a bottom wall closing the bottom of said section;
    means on the upper side of said bottom wall for facilitating the building of honeycomb thereon and within the space defined by said bottom wall and said perimeter means, said sections being arrangeable in said hive with the bottom wall of one section facing toward the open top of said next section in said row, said bottom wall of said one section having at least a portion of its periphery spaced from the opposed top edge of said next section by a bee entry of height sufficient for bees to pass between said one section bottom and the next section top edge, the central portion of said one section bottom having means bounding the top of the bee working zone in said next section for limiting the surface contour and depth of comb which bees can build in said next section below said bee working zone.

6. The device of claim 5 including support legs extending downwardly from and in alignment with said perimeter means.

7. The device of claim 5 wherein said means for facilitating the building of honeycomb includes a surface embossed in the manner of honeycomb foundation.

8. A comb honey section as defined in claim 7 wherein said surface is a surface of beeswax.

9. The comb section of claim 5 wherein the distance from said means on the upper side of said bottom wall to the top edge of said sides is at least $\frac{3}{4}$ inch in extent.

10. The device of claim 5 wherein the distance from said means on the upper side of said bottom wall to the upper edge of said sides is between $\frac{3}{4}$ and $1\frac{1}{4}$ inch.

11. A comb section for the production of comb honey comprising:

perimeter means defining the sides of said section and closure means along one edge of said perimeter means defining a bottom;

means on the upper side of said bottom for facilitating the building of honeycomb thereon and within the space defined by said bottom and said perimeter means, said bottom being upwardly beveled along at least a portion of its periphery in order that, upon cooperation with the adjacently positioned section, the bees may be provided with sufficient space to pass between said beveled bottom and the upper edge of that portion of a lower section immediately adjacent thereto while the unbeveled portion of said bottom will limit the building of comb in said last-named section.

* * * * *